(12) United States Patent
Ooishi et al.

(10) Patent No.: US 10,303,994 B2
(45) Date of Patent: May 28, 2019

(54) NON-CONTRACT DATA RECEIVING/TRANSMITTING BODY

(71) Applicant: Toppan Forms Co., Ltd., Tokyo (JP)

(72) Inventors: Norihiro Ooishi, Ageo (JP); Hitoshi Kagaya, Tokyo (JP); Yoshihiro Mizunuma, Koshigaya (JP)

(73) Assignee: TOPPAN FORMS CO., LTD., Tokyo (JP)

( * ) Notice: Subject to any disclaimer, the term of this patent is extended or adjusted under 35 U.S.C. 154(b) by 28 days.

(21) Appl. No.: 15/519,029

(22) PCT Filed: Oct. 28, 2015

(86) PCT No.: PCT/JP2015/080403
§ 371 (c)(1),
(2) Date: Apr. 13, 2017

(87) PCT Pub. No.: WO2016/068195
PCT Pub. Date: May 6, 2016

(65) Prior Publication Data
US 2017/0236048 A1   Aug. 17, 2017

(30) Foreign Application Priority Data

Oct. 30, 2014   (JP) .................................. 2014-221419

(51) Int. Cl.
*G06K 19/077* (2006.01)
*H01Q 1/22* (2006.01)
(Continued)

(52) U.S. Cl.
CPC . *G06K 19/07745* (2013.01); *G06K 19/07749* (2013.01); *G06K 19/07779* (2013.01);
(Continued)

(58) Field of Classification Search
CPC ... G06K 7/01; G06K 19/07745; H01Q 1/2225
(Continued)

(56) References Cited

U.S. PATENT DOCUMENTS

2009/0189822 A1 * 7/2009 Hockey ............ G06K 19/07749
343/793
2009/0219158 A1 * 9/2009 Nikitin ................. H01Q 1/2225
340/572.7
(Continued)

FOREIGN PATENT DOCUMENTS

CN       201466215 U     5/2010
JP       A2008167190     7/2008
(Continued)

OTHER PUBLICATIONS

International Search Report for PCT/JP2015/080403 dated Dec. 1, 2015.
(Continued)

*Primary Examiner* — Peguy Jean Pierre
(74) *Attorney, Agent, or Firm* — Hoffmann & Baron, LLP

(57) ABSTRACT

A non-contact data receiving/transmitting body is provided which includes an IC chip, a first antenna to which the IC chip is connected, and a second antenna for use as a booster that resonates with the first antenna in a non-contact manner. The first antenna is a ring-shaped antenna having at least three straight portions. The second antenna has a central portion that is bent such that parts of the central portion extend respectively along the three straight portions of the first antenna and are at an angle equal to or greater than 90° to each other. The IC chip is provided on the three straight portions of the first antenna and is connected to the first antenna at the straight portions.

7 Claims, 5 Drawing Sheets

(51) Int. Cl.
*H01Q 9/04* (2006.01)
*H01Q 7/00* (2006.01)
*H01Q 1/38* (2006.01)

(52) U.S. Cl.
CPC . *G06K 19/07786* (2013.01); *G06K 19/07794* (2013.01); *H01Q 1/2225* (2013.01); *H01Q 1/2283* (2013.01); *H01Q 7/00* (2013.01); *H01Q 9/0464* (2013.01); *H01Q 1/38* (2013.01)

(58) Field of Classification Search
USPC .............................. 343/728; 340/10.1, 572.7
See application file for complete search history.

(56) References Cited

U.S. PATENT DOCUMENTS

| | | | |
|---|---|---|---|
| 2011/0063184 A1 | 3/2011 | Furumura et al. | |
| 2011/0284641 A1 | 11/2011 | Yang | |
| 2012/0249306 A1* | 10/2012 | Tada | G06K 19/07767 340/10.1 |
| 2015/0021402 A1* | 1/2015 | Finn | G06K 19/07794 235/492 |
| 2015/0214619 A1* | 7/2015 | Shimizu | H01Q 1/243 343/748 |
| 2015/0261983 A1* | 9/2015 | Ruotsalainen | H04B 5/0062 235/439 |

FOREIGN PATENT DOCUMENTS

| | | |
|---|---|---|
| JP | A2010074809 | 4/2010 |
| JP | A2013171428 | 2/2013 |

OTHER PUBLICATIONS

Chinese Office Action for Application No. 201580058123.3, pp. 1-13, dated Dec. 25, 2018.

* cited by examiner

NON-CONTACT DATA RECEIVING/TRANSMITTING BODY

TECHNICAL FIELD

The present invention relates to a non-contact data receiving/transmitting body.

Priority is claimed on Japanese Patent Application No. 2014-221419, filed on Oct. 30, 2014, the content of which is incorporated herein by reference.

BACKGROUND ART

An IC tag is an example of a non-contact data receiving/transmitting body which can receive or transmit information from or to the outside using electromagnetic or radio waves as a medium, similar to an information recording medium for radio frequency identification (RFID).

A known example of an IC tag includes an IC chip, a first antenna connected to the IC chip, and a second antenna for use as a booster that is arranged adjacent to the first antenna and resonates with the first antenna in a non-contact manner (for example, see Patent Literature 1).

CITATION LIST

Patent Literature

[Patent Literature 1]
Japanese Unexamined Patent Application. First Publication No. 2013-171428

Summary of Invention

Technical Problem

However, in the non-contact data receiving/transmitting body described in Patent Literature 1, the first antenna has a circular ring shape, while the second antenna has a shape with three straight portions. Therefore, the second antenna is not arranged along the first antenna. Thus, the non-contact data receiving/transmitting body has problems in that the electromagnetic coupling between the first antenna and the second antenna is weak and long-distance communication is difficult.

The present invention has been made in view of the above circumstances and an object of the present invention is to provide a non-contact data receiving/transmitting body including a first antenna and a second antenna for use as a booster that resonates with the first antenna in a non-contact manner, which provides strong electromagnetic coupling between the two antennas and can perform long-distance communication.

Solution to Problem

A non-contact data receiving/transmitting body of the present invention includes an IC chip, a first antenna to which the IC chip is connected, and a second antenna for use as a booster that resonates with the first antenna in a non-contact manner, wherein the first antenna is a ring-shaped antenna having at least three straight portions, the second antenna has a central portion that is bent such that parts of the central portion extend respectively along the three straight portions of the first antenna and are at an angle equal to or greater than 90° to each other, and the IC chip is provided on the three straight portions of the first antenna and is connected to the first antenna at the straight portions.

In the non-contact data receiving/transmitting body of the present invention, the second antenna is arranged such that gaps between the second antenna and the three straight portions of the first antenna are equal to or less than 2 mm.

In the non-contact data receiving/transmitting body of the present invention, the first antenna has a quadrilateral ring shape, and the second antenna is arranged along the first antenna over a length which is equal to or more than three quarters of a length of the first antenna.

Advantageous Effects of Invention

According to the present invention, it is possible to provide a non-contact data receiving/transmitting body including a first antenna and a second antenna for use as a booster that resonates with the first antenna in a non-contact manner, which provides strong electromagnetic coupling between the two antennas and can perform long-distance communication.

DESCRIPTION OF EMBODIMENTS

Embodiments of the non-contact data receiving/transmitting body of the present invention will now be described. The embodiments are intended to provide a detailed description for better understanding of the nature of the present invention and are not intended to limit the present invention unless otherwise specified.

(1) First Embodiment

Figure 1:
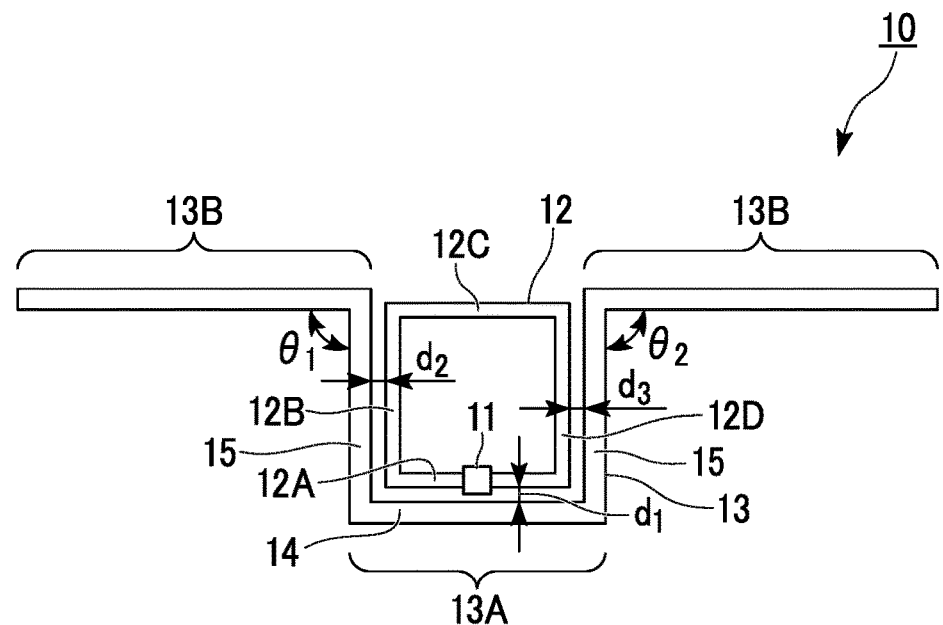
FIG. 1 is a schematic plan view illustrating a non-contact data receiving/transmitting body of a first embodiment.

FIG. 1 is a schematic plan view illustrating a non-contact data receiving/transmitting body of the present embodiment.

The non-contact data receiving/transmitting body 10 of the present invention includes an IC chip 11, a first antenna 12 to which the IC chip 11 is connected, and a second antenna 13 which is used as a booster and resonates with the first antenna 12 in a non-contact manner.

The first antenna 12 is a quadrilateral ring-shaped antenna having four straight portions 12A. 12B, 12C, and 12D. In the present embodiment, the first antenna 12 is in the form of a square ring.

The second antenna 13 includes a central portion 13A and straight-shaped booster antenna portions 13B and 13B that are connected to the central portion 13A and extend from the central portion 13A respectively to the left and right in the figure. The central portion 13A of the second antenna 13 is bent such that parts of the central portion 13A are at an angle of 90° to each other and extend respectively along the three straight portions 12A, 12B, and 12D of the first antenna 12. In other words, the central portion 13A of the second antenna 13, which is arranged along the first antenna 12 having the form of a quadrilateral ring, is U-shaped. Angles $\theta_1$ and $\theta_2$ at which the central portion 13A meets the booster antenna portions 13B and 13B are 90°.

The central portion 13A of the second antenna 13 is arranged at the center of the second antenna 13 in the longitudinal direction thereof (i.e., in the horizontal direction in the figure) and includes a first straight portion 14 that is in parallel to the longitudinal direction of the second antenna 13 and second straight portions 15 and 15 which are connected to the first straight portion 14 and perpendicular to the first straight portion 14 (i.e., perpendicular to the longitudinal direction of the second antenna 13).

Further, the second antenna 13 is line-symmetric with respect to a vertical line (i.e., a center line) which passes through the center of the central portion 13A and is perpendicular to the longitudinal direction of the second antenna 13 (i.e., the second antenna 13 is line-symmetric left and right in the figure).

Although the present embodiment is exemplified by the case in which the angles $\theta_1$ and $\theta_2$ at which the central portion 13A meets the booster antenna portions 13B and 13B in the second antenna 13 are 90°, the present embodiment is not limited to this case. In the present embodiment, the angles $\theta_1$ and $\theta_2$ at which the central portion 13A meets the booster antenna portions 13B and 13B in the second antenna 13 may be equal to or greater than 90°. When the angles $\theta_1$ and $\theta_2$ at which the central portion 13A meets the booster antenna portions 13B and 13B in the second antenna 13 are less than 90°, the influence of loss at the bent portions is great, which reduces the communication distance.

The IC chip 11 is arranged on the straight portion 12A of the first antenna 12 such that the IC chip 11 is connected to the first antenna 12 at the straight portion 12A. More specifically, the IC chip 11 is arranged at a central portion of the straight portion 12A of the first antenna 12. Thus, the IC chip 11 is arranged adjacent to a central portion of the first straight portion 14 of the second antenna 13. This arrangement allows the IC chip 11 to be positioned adjacent to the second antenna 13 as a power supply point for the first antenna 12. This makes it possible to increase the communication distance.

The second antenna 13 is preferably arranged such that gaps $d_1$, $d_2$, and $d_3$ between the second antenna 13 and the three straight portions 12A, 12B, and 12D of the first antenna 12 are equal to or less than 2 mm. The gap $d_1$ is the space between the straight portion 12A of the first antenna 12 and (the central portion 13A of) the second antenna 13. The gap $d_2$ is the space between the straight portion 12B of the first antenna 12 and (the central portion 13A of) the second antenna 13. The gap $d_3$ is the space between the straight portion 12D of the first antenna 12 and (the central portion 13A of) the second antenna 13.

The purpose of this arrangement is to increase the electromagnetic coupling between the first antenna 12 and the second antenna 13. That is, the electromagnetic coupling between the first antenna 12 and the second antenna 13 may be reduced when the gaps $d_1$, $d_2$, and $d_3$ between the second antenna 13 and the three straight portions 12A, 12B, and 12D of the first antenna 12 exceed 2 mm.

As shown in FIG. 1, the second antenna 13 is preferably arranged along the first antenna 12 over a length which is equal to or more than three quarters of the length of the first antenna 12.

This makes it possible to increase the electromagnetic coupling between the first antenna 12 and the second antenna 13.

The arrangement of the first antenna 12 and the second antenna 13 may be any of those listed below.

(a) An arrangement in which the first antenna 12 and the second antenna 13 are included in the same plane.

(b) An arrangement in which the second antenna 13 is included in a plane that is different from a plane (hereinafter referred to as an "opening plane") in which the first antenna 12 is included, and the central portion 13A of the second antenna 13 overlaps the three straight portions 12A, 12B, and 12D of the first antenna when the opening plane is viewed in a plan view.

(c) An arrangement in which the second antenna 13 is included in a plane different from the opening plane, and when the opening plane is viewed in a plan view, at least one of the first straight portion 14 and the second straight portions 15 and 15, which constitute the central portion 13A of the second antenna 13, does not overlap the three straight portions 12A, 12B, and 12D of the first antenna 12 (provided that the gaps $d_1$, $d_2$, and $d_3$ (wherein the distance between the opening plane and the plane including the second antenna 13 is also taken into account) are equal to or less than 2 mm).

The non-contact data receiving/transmitting body 10 of the present embodiment may have any of the above arrangements (a), (b), and (c). Accordingly, the non-contact data receiving/transmitting body 10 of the present embodiment has high freedom of design.

The IC chip 11 is not particularly limited and any IC chip may be used as long as information can be written to or read from it in a non-contact manner via the first antenna 12 and the second antenna 13. Any IC chip may be used as the IC chip 11 provided that it is applicable to RFID media such as a non-contact type IC card, a non-contact type IC tag or a non-contact type IC label.

Antennas that may be used as the first antenna 12 and the second antenna 13 include the following: an antenna made of a conductive ink such as a known polymer-type conductive ink or a silver ink composition; an antenna made by etching a metal foil; an antenna made of a metal thin film formed using various film formation methods such as metal evaporation, electroplating, or electrostatic plating; an antenna made by punching a metal plate; a fibrous antenna made of a metal; an antenna made by kneading fibers formed of a resin with a conductive material such as a metal; and an antenna made by coating fibers formed of a resin with a conductive material through plating, evaporation or the like.

In the non-contact data receiving/transmitting body 10 of the present embodiment, the electromagnetic coupling between the first antenna 12 and the second antenna 13 is increased and the power supply point (i.e., the IC chip 11) is positioned adjacent to the second antenna 13. This allows the non-contact data receiving/transmitting body 10 of the present embodiment to perform long-distance communication.

(2) Second Embodiment

Figure 2:
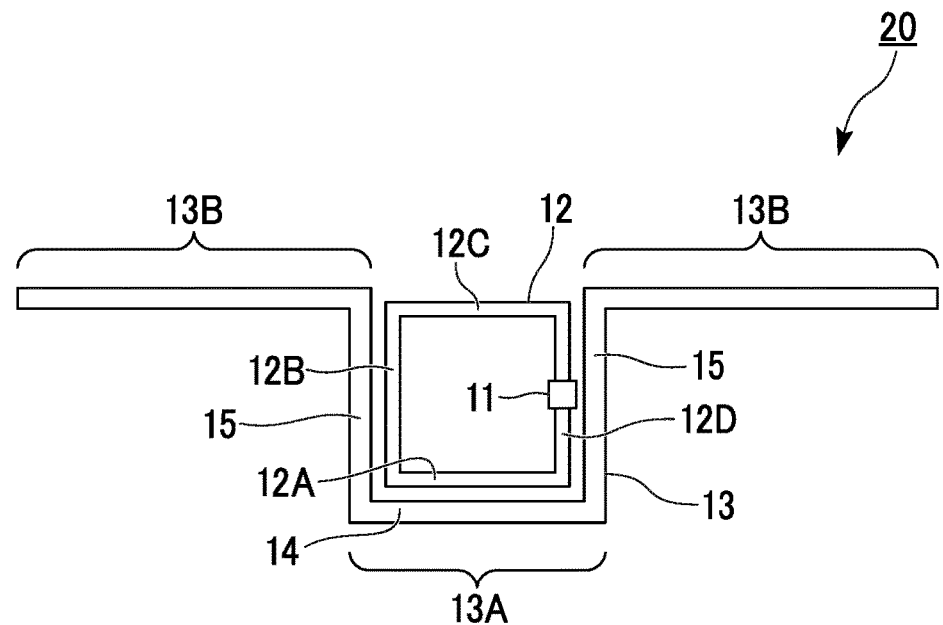
FIG. 2 is a schematic plan view illustrating a non-contact data receiving/transmitting body of a second embodiment.

FIG. 2 is a schematic plan view illustrating a non-contact data receiving/transmitting body of the present embodiment. In FIG. 2, the same elements as those of the non-contact data receiving/transmitting body of the first embodiment shown in FIG. 1 are denoted by the same reference numbers and descriptions thereof are omitted.

The non-contact data receiving/transmitting body 20 of the present embodiment differs from the non-contact data receiving/transmitting body 10 of the first embodiment in the following two points: the IC chip 11 is arranged at a central portion of the straight portion 12D of the first antenna 12; and the IC chip 11 is arranged adjacent to a central portion of one of the second straight portions 15 (at the right side in the figure) of the second antenna 13.

In the non-contact data receiving/transmitting body 20 of the present embodiment, the electromagnetic coupling between the first antenna 12 and the second antenna 13 is increased and the power supply point (i.e., the IC chip 11) is positioned adjacent to the second antenna 13. This allows the non-contact data receiving/transmitting body 20 of the present embodiment to perform long-distance communication.

(3) Third Embodiment

Figure 3:
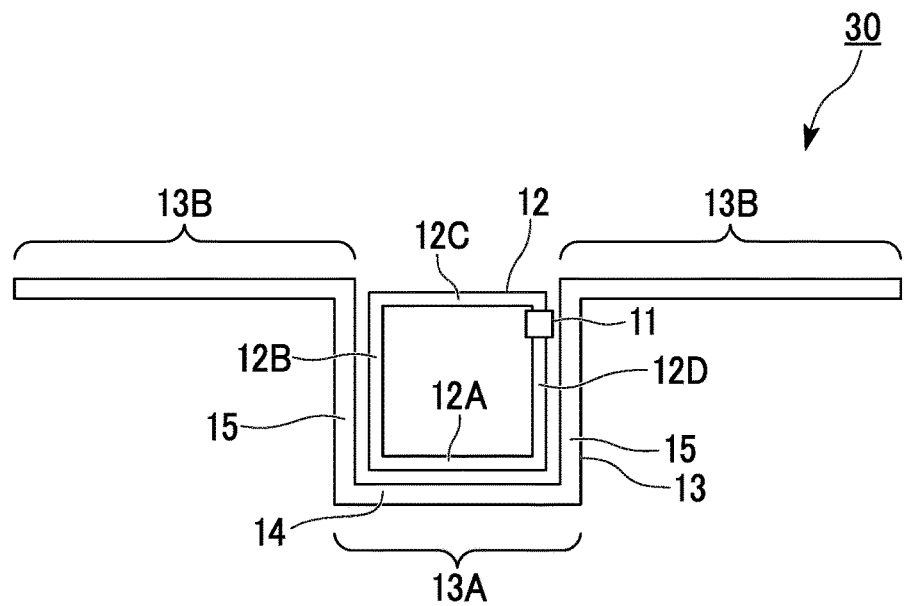
FIG. 3 is a schematic plan view illustrating a non-contact data receiving/transmitting body of a third embodiment.

FIG. 3 is a schematic plan view illustrating a non-contact data receiving/transmitting body of the present embodiment. In FIG. 3, the same elements as those of the non-contact data receiving/transmitting body of the first embodiment shown in FIG. 1 are denoted by the same reference numbers and descriptions thereof are omitted.

The non-contact data receiving/transmitting body 30 of the present embodiment differs from the non-contact data receiving/transmitting body 10 of the first embodiment in the following two points: the IC chip 11 is arranged at a portion of the first antenna 12 adjacent to the boundary between the straight portions 12C and 12D of the first antenna 12; and the IC chip 11 is arranged adjacent to a portion of the second antenna 13 which is adjacent to the boundary between one of the second straight portions 15 (at the right side in the figure) and the booster antenna portions 13B of the second antenna 13.

In the non-contact data receiving/transmitting body 30 of the present embodiment, the electromagnetic coupling between the first antenna 12 and the second antenna 13 is increased and the power supply point (i.e., the IC chip 11) is positioned adjacent to the second antenna 13. This allows the non-contact data receiving/transmitting body 30 of the present embodiment to perform long-distance communication.

(4) Fourth Embodiment

Figure 4:
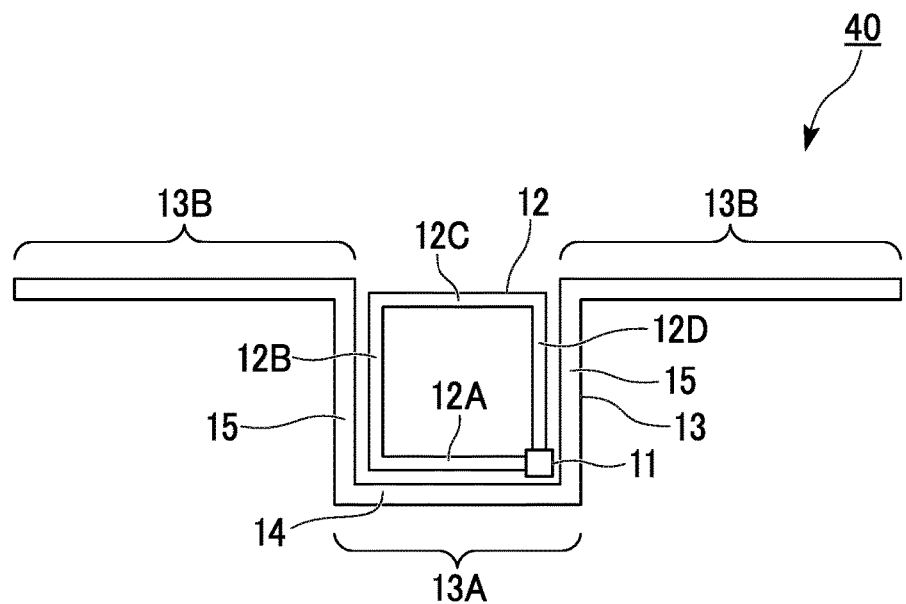
FIG. 4 is a schematic plan view illustrating a non-contact data receiving/transmitting body of a fourth embodiment.

FIG. 4 is a schematic plan view illustrating a non-contact data receiving/transmitting body of the present embodiment. In FIG. 4, the same elements as those of the non-contact data receiving/transmitting body of the first embodiment shown in FIG. 1 are denoted by the same reference numbers and descriptions thereof are omitted.

The non-contact data receiving/transmitting body 40 of the present embodiment differs from the non-contact data receiving/transmitting body 10 of the first embodiment in the following two points: the IC chip 11 is arranged at the boundary between the straight portions 12A and 12D of the first antenna 12; and the IC chip 11 is arranged adjacent to a portion of the second antenna 13 adjacent to the boundary between the first straight portion 14 and one of the second straight portions 15 (at the right side in the figure) of the second antenna 13.

In the non-contact data receiving/transmitting body 40 of the present embodiment, the electromagnetic coupling between the first antenna 12 and the second antenna 13 is increased and the power supply point (i.e., the IC chip 11) is positioned adjacent to the second antenna 13. This allows the non-contact data receiving/transmitting body 40 of the present embodiment to perform long-distance communication.

(5) Fifth Embodiment

Figure 5:
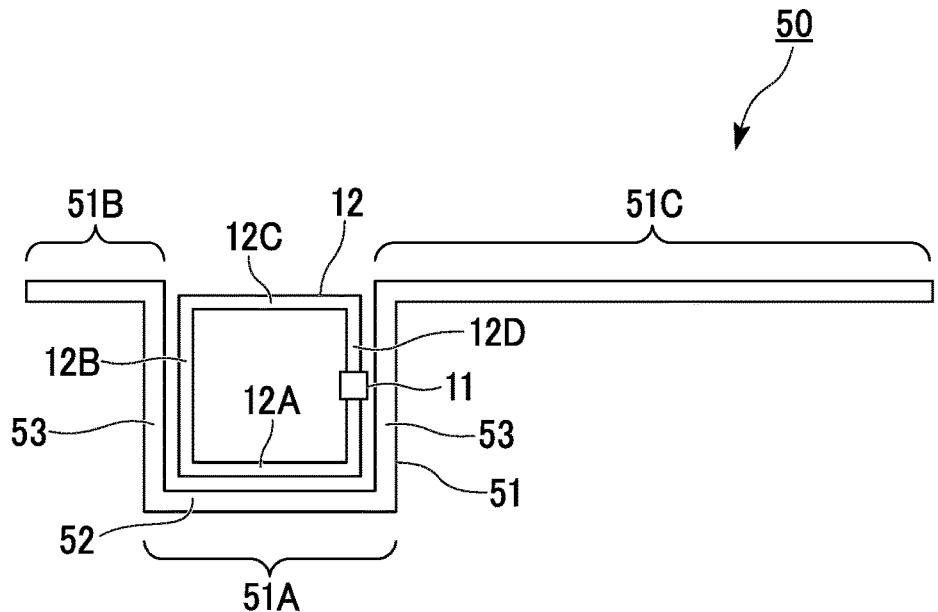
FIG. 5 is a schematic plan view illustrating a non-contact data receiving/transmitting body of a fifth embodiment.

FIG. 5 is a schematic plan view illustrating a non-contact data receiving/transmitting body of the present embodiment. In FIG. 5, the same elements as those of the non-contact data receiving/transmitting body of the first embodiment shown in FIG. 1 are denoted by the same reference numbers and descriptions thereof are omitted.

The non-contact data receiving/transmitting body 50 of the present embodiment differs from the non-contact data receiving/transmitting body 10 of the first embodiment in that the second antenna 51 is asymmetric with respect to a vertical line which passes through the center of the central portion 51A and is perpendicular to the longitudinal direction of the second antenna 51 (i.e., the second antenna 51 is left-right asymmetric in the figure). That is, the second antenna 51 is configured such that a booster antenna portion 51B at the left side in the figure of a vertical line which passes through the center of the central portion 51A and is perpendicular to the longitudinal direction of the second antenna 51 is shorter than a booster antenna portion 51C at the right side in the figure.

In addition, the non-contact data receiving/transmitting body 50 of the present embodiment differs from the non-contact data receiving/transmitting body 10 of the first embodiment in the following two points: the IC chip 11 is arranged at a central portion of the straight portion 12D of the first antenna 12; and the IC chip 11 is arranged adjacent to a central portion of one (at the right side in the figure) of the second straight portions 53 of the second antenna 51 (which are perpendicularly connected to the first straight portion 52).

Further, when the second antenna 51 extends along a straight line, the IC chip 11 is arranged closer to a central portion of the straight line.

In the non-contact data receiving/transmitting body 50 of the present embodiment, the electromagnetic coupling between the first antenna 12 and the second antenna 51 is increased and the power supply point (i.e., the IC chip 11) is positioned adjacent to the second antenna 51. This allows the non-contact data receiving/transmitting body 50 of the present embodiment to perform long-distance communication.

(6) Sixth Embodiment

Figure 6:
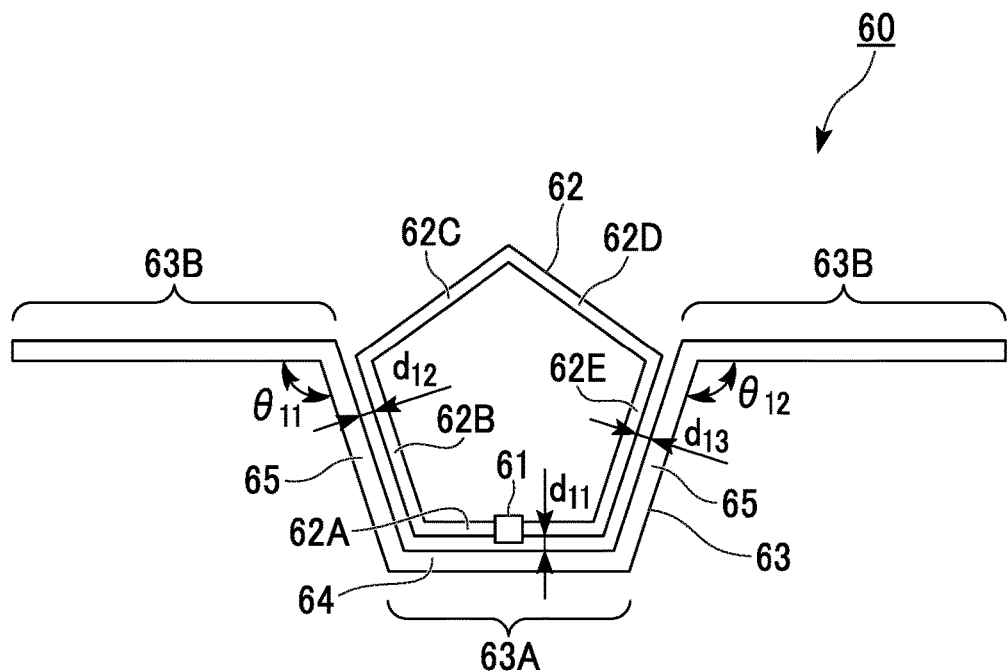
FIG. 6 is a schematic plan view illustrating a non-contact data receiving/transmitting body of a sixth embodiment.

FIG. 6 is a schematic plan view illustrating a non-contact data receiving/transmitting body of the present embodiment.

The non-contact data receiving/transmitting body 60 of the present invention includes an IC chip 61, a first antenna 62 to which the IC chip 61 is connected, and a second antenna 63 for use as a booster that resonates with the first antenna 62 in a non-contact manner.

The first antenna 62 is a pentagonal ring-shaped antenna having five straight portions 62A, 62B, 62C, 62D, and 62E. In the present embodiment, the first antenna 62 is in the form of a regular pentagonal ring.

The second antenna 63 includes a central portion 63A and straight-shaped booster antenna portions 63B and 63B that are connected to the central portion 63A and extend from the central portion 63A respectively to the left and right in the figure. The central portion 63A of the second antenna 63 is bent such that parts of the central portion 63A are at an angle equal to or greater than 90° to each other and extend respectively along the three straight portions 62A, 62B, and 62E of the first antenna 62. In other words, the central portion 63A of the second antenna 63, which is arranged along the first antenna 62 having the form of a pentagonal ring, is tapered such that the width of the central portion 63A gradually decreases away from the booster antenna portions 63B and 63B. Angles $\theta_{11}$ and $\theta_{12}$ at which the central portion 63A meets the booster antenna portions 63B and 63B are equal to or greater than 90°.

The central portion 63A of the second antenna 63 is arranged at the center of the second antenna 63 in the longitudinal direction thereof (i.e., in the horizontal direction in the figure) and includes a first straight portion 64 that is in parallel to the longitudinal direction of the second antenna 63 and second straight portions 65 and 65 which are connected to the first straight portion 64 and obliquely meet the first straight portion 64 respectively at angles $\theta_{11}$ and $\theta_{12}$.

Further, the second antenna 63 is line-symmetric with respect to a vertical line (i.e., a center line) which passes through the center of the central portion 63A and is perpendicular to the longitudinal direction of the second antenna 63 (i.e., the second antenna 63 is line-symmetric left and right in the figure).

The IC chip 61 is arranged on the straight portion 62A of the first antenna 62 such that the IC chip 61 is connected to the first antenna 62 at the straight portion 62A. More specifically, the IC chip 61 is arranged at a central portion of the straight portion 62A of the first antenna 62. Thus, the IC chip 61 is arranged adjacent to a central portion of the first straight portion 64 of the second antenna 63.

The second antenna 63 is preferably arranged such that gaps $d_{11}$, $d_{12}$, and $d_{13}$ between the second antenna 63 and the three straight portions 62A, 62B, and 62E of the first antenna 62 are equal to or less than 2 mm. The gap $d_{11}$ is the space between the straight portion 62A of the first antenna 62 and (the central portion 63A of) the second antenna 63. The gap $d_{12}$ is the space between the straight portion 62B of the first antenna 62 and (the central portion 63A of) the second antenna 63. The gap $d_{13}$ is the space between the straight portion 62E of the first antenna 62 and (the central portion 63A of) the second antenna 63.

The purpose of this arrangement is to increase the electromagnetic coupling between the first antenna 62 and the second antenna 63. That is, the electromagnetic coupling between the first antenna 62 and the second antenna 63 may be reduced when the gaps $d_{11}$, $d_{12}$, and $d_{13}$ between the second antenna 63 and the three straight portions 62A, 62B, and 62E of the first antenna 62 exceed 2 mm.

The arrangement of the first antenna 62 and the second antenna 63 may be any of those listed below.

(a) An arrangement in which the first antenna 62 and the second antenna 63 are included in the same plane.

(b) An arrangement in which the second antenna 63 is included in a plane that is different from a plane (hereinafter referred to as an "opening plane") in which the first antenna 62 is included, and the central portion 63A of the second antenna 63 overlaps the three straight portions 62A, 62B, and 62E of the first antenna when the opening plane is viewed in a plan view.

(c) An arrangement in which the second antenna 63 is included in a plane different from the opening plane and, when the opening plane is viewed in a plan view, at least one of the first straight portion 64 and the second straight portions 65 and 65, which constitute the central portion 63A of the second antenna 63, does not overlap the three straight portions 62A, 62B, and 62E of the first antenna 62 (provided that the gaps $d_{11}$, $d_{12}$, and $d_{13}$ (wherein the distance between the opening plane and the plane including the second antenna 63 is also taken into account) are equal to or less than 2 mm).

The non-contact data receiving/transmitting body 60 of the present embodiment may have any of the above arrangements (a), (b), and (c). Accordingly, the non-contact data receiving/transmitting body 60 of the present embodiment has high freedom of design.

Any IC chip that may be used as the IC chip 11 described above may be used as the IC chip 61.

Any antennas that may be used as the first antenna 12 and the second antenna 13 described above may be used as the first antenna 62 and the second antenna 63.

In the non-contact data receiving/transmitting body 60 of the present embodiment, the electromagnetic coupling between the first antenna 62 and the second antenna 63 is increased and the power supply point (i.e., the IC chip 61) is positioned adjacent to the second antenna 63. This allows the non-contact data receiving/transmitting body 60 of the present embodiment to perform long-distance communication.

(7) Seventh Embodiment

Figure 7:
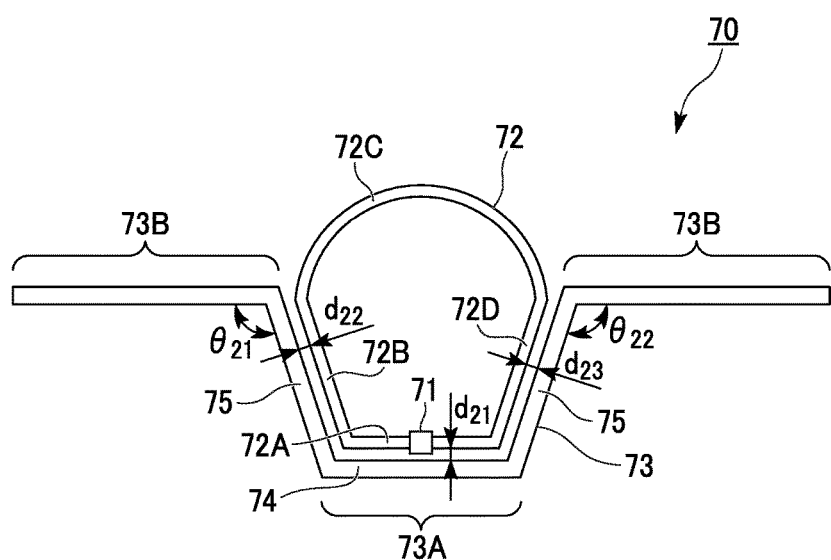
FIG. 7 is a schematic plan view illustrating a non-contact data receiving/transmitting body of a seventh embodiment.

FIG. 7 is a schematic plan view illustrating a non-contact data receiving/transmitting body of the present embodiment.

The non-contact data receiving/transmitting body 70 of the present invention includes an IC chip 71, a first antenna 72 to which the IC chip 71 is connected, and a second antenna 73 for use as a booster that resonates with the first antenna 72 in a non-contact manner.

The first antenna 72 is a ring-shaped antenna having three straight portions 72A, 72B, and 72D and one curved portion 72C. In the present embodiment, the first antenna 72 is in the form of a ring including a trapezoidal shape defined by the three straight portions 72A, 72B, and 72D and a semicircular shape defined by the curved portion 72C which is arranged at a position corresponding to the upper base (i.e., the top side in the figure) of the trapezoidal shape and bulges outward from the upper base.

The second antenna 73 includes a central portion 73A and straight-shaped booster antenna portions 73B and 73B that are connected to the central portion 73A and extend from the central portion 73A respectively to the left and right in the figure. The central portion 73A of the second antenna 73 is bent such that parts of the central portion 73A are at an angle equal to or greater than 90° to each other and extend respectively along the three straight portions 72A, 72B, and 72D of the first antenna 72. In other words, the central portion 73A of the second antenna 73, which is arranged along the first antenna 72 having the form of a ring, is tapered such that the width of the central portion 73A gradually decreases away from the booster antenna portions 73B and 73B. Angles $\theta_{21}$ and $\theta_{22}$ at which the central portion 73A meets the booster antenna portions 73B and 73B are equal to or greater than 90°.

The central portion 73A of the second antenna 73 is arranged at the center of the second antenna 73 in the longitudinal direction thereof (i.e., in the horizontal direction in the figure) and includes a first straight portion 74 that is in parallel to the longitudinal direction of the second antenna 73 and second straight portions 75 and 75 which are connected to the first straight portion 74 and obliquely meet the first straight portion 74 respectively at angles $\theta_{21}$ and $\theta_{22}$.

Further, the second antenna 73 is line-symmetric with respect to a vertical line (i.e., a center line) which passes through the center of the central portion 73A and is perpendicular to the longitudinal direction of the second antenna 73 (i.e., the second antenna 73 is line-symmetric left and right in the figure).

The IC chip 71 is arranged on the straight portion 72A of the first antenna 72 such that the IC chip 71 is connected to the first antenna 72 at the straight portion 72A. More specifically, the IC chip 71 is arranged at a central portion of the straight portion 72A of the first antenna 72. Thus, the IC chip 71 is arranged adjacent to a central portion of the first straight portion 74 of the second antenna 73.

The second antenna 73 is preferably arranged such that gaps $d_{21}$, $d_{22}$, and $d_{23}$ between the second antenna 73 and the three straight portions 72A, 72B, and 72D of the first antenna 72 are equal to or less than 2 mm. The gap $d_{21}$ is the space between the straight portion 72A of the first antenna 72 and (the central portion 73A of) the second antenna 73. The gap $d_{22}$ is the space between the straight portion 72B of the first antenna 72 and (the central portion 73A of) the second antenna 73. The gap $d_{23}$ is the space between the straight portion 72D of the first antenna 72 and (the central portion 73A of) the second antenna 73.

The purpose of this arrangement is to increase the electromagnetic coupling between the first antenna 72 and the second antenna 73. That is, the electromagnetic coupling between the first antenna 72 and the second antenna 73 may be reduced when the gaps $d_{21}$, $d_{22}$, and $d_{23}$ between the second antenna 73 and the three straight portions 72A, 72B, and 72D of the first antenna 72 exceed 2 mm.

The arrangement of the first antenna 72 and the second antenna 73 may be any of those listed below.

(a) An arrangement in which the first antenna 72 and the second antenna 73 are included in the same plane.

(b) An arrangement in which the second antenna 73 is included in a plane that is different from a plane (hereinafter referred to as an "opening plane") in which the first antenna 72 is included, and the central portion 73A of the second antenna 73 overlaps the three straight portions 72A, 72B, and 72D of the first antenna when the opening plane is viewed in a plan view.

(c) An arrangement in which the second antenna 73 is included in a plane different from the opening plane and, when the opening plane is viewed in a plan view, at least one of the first straight portion 74 and the second straight portions 75, which constitute the central portion 73A of the second antenna 73, does not overlap the three straight portions 72A, 72B, and 72D of the first antenna 72 (provided that the gaps $d_{21}$, $d_{22}$, and $d_{23}$ (wherein the distance between the opening plane and the plane including the second antenna 73 is also taken into account) are equal to or less than 2 mm).

The non-contact data receiving/transmitting body 70 of the present embodiment may have any of the above arrangements (a), (b), and (c). Accordingly, the non-contact data receiving/transmitting body 70 of the present embodiment has high degree of freedom of design.

Any IC chip that may be used as the IC chip 11 described above may be used as the IC chip 71.

Any antennas that may be used as the first antenna 12 and the second antenna 13 described above may be used as the first antenna 72 and the second antenna 73.

In the non-contact data receiving/transmitting body 70 of the present embodiment, the electromagnetic coupling between the first antenna 72 and the second antenna 73 is increased and the power supply point (i.e., the IC chip 71) is positioned adjacent to the second antenna 73. This allows the non-contact data receiving/transmitting body 70 of the present embodiment to perform long-distance communication.

(8) Eighth Embodiment

Figure 8:
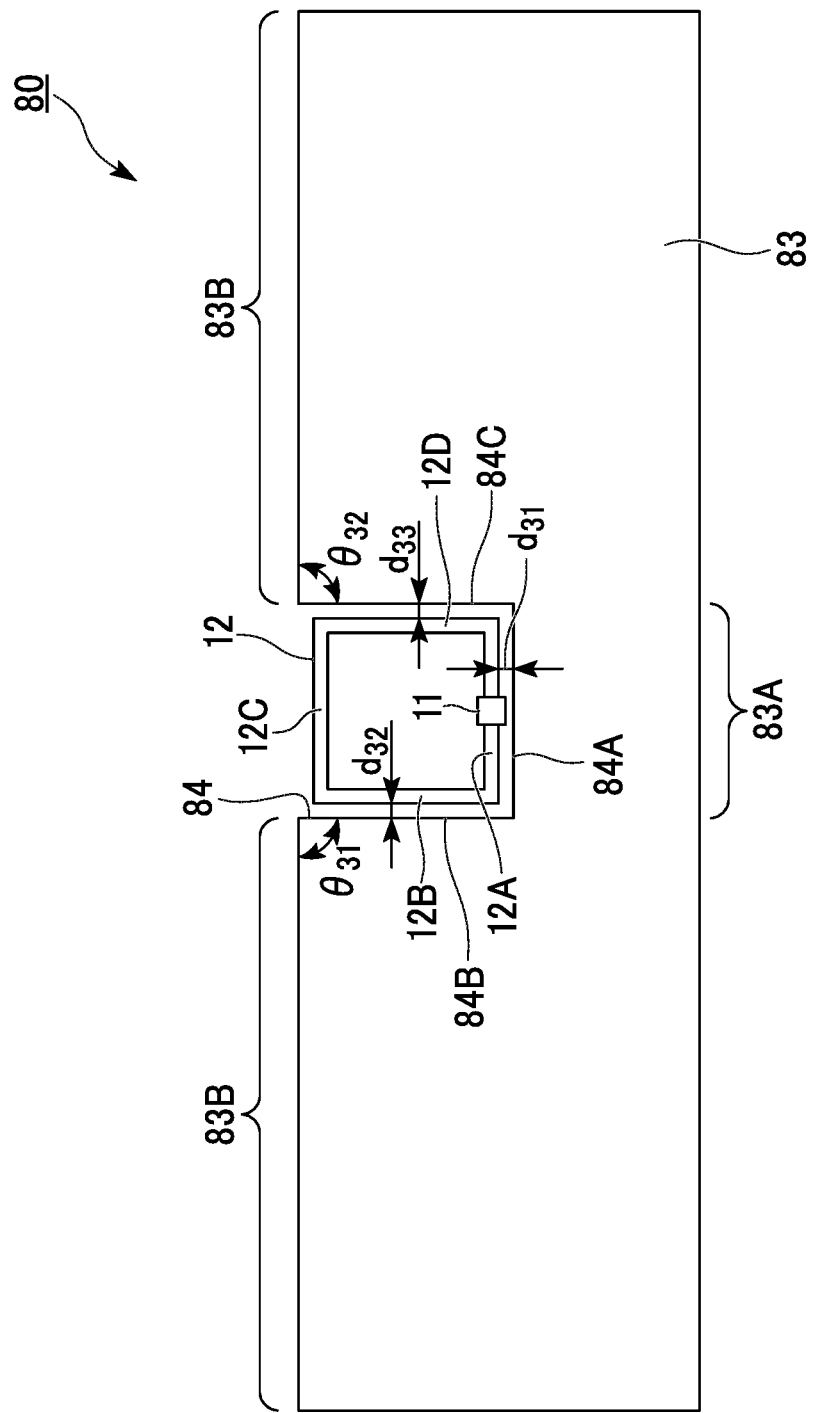
FIG. 8 is a schematic plan view illustrating a non-contact data receiving/transmitting body of an eighth embodiment.

FIG. 8 is a schematic plan view illustrating a non-contact data receiving/transmitting body of the present embodiment. In FIG. 8, the same elements as those of the non-contact data receiving/transmitting body of the first embodiment shown in FIG. 1 are denoted by the same reference numbers and descriptions thereof are omitted.

The non-contact data receiving/transmitting body 80 of the present invention includes an IC chip 11, a first antenna 12 to which the IC chip 11 is connected, and a second antenna 83 for use as a booster that resonates with the first antenna 12 in a non-contact manner.

The second antenna 83 includes a plate-shaped central portion 83A having a recessed portion 84 and plate-shaped booster antenna portions 83B and 83B that are connected to the central portion 83A and extend from the central portion 83A respectively to the left and right in the figure. That is, the second antenna 83 is formed of a conductive plate-shaped (i.e., strip-shaped) antenna as shown in FIG. 8. The central portion 83A has the recessed portion 84 that is recessed from one longitudinal side of the plate (i.e., one horizontally extending side in the figure) in the traverse direction of the plate (i.e., in the vertical direction in the figure, perpendicular to the longitudinal direction). In other words, the recessed portion 84 of the second antenna 83 is formed by the central portion 83A being recessed such that parts of the central portion 83A extend respectively along the three straight portions 12A, 12B, and 12D of the first antenna 12 and are at an angle of 90° to each other. In other words, the second antenna 83 has the recessed portion 84 having three side portions 84A, 84B, and 84C which are formed by the central portion 83A being bent. That is, the recessed portion 84 formed in the central portion 83A of the second antenna 83, which is arranged along the first antenna 12 having the form of a quadrilateral ring, is U-shaped. Angles $\theta_{31}$ and $\theta_{32}$ at which the recessed portion 84 meets the booster antenna portions 83B and 83B are 90°. Thus, the second antenna 83 is bent (i.e., recessed) at the central portion 83A in the longitudinal direction of the second antenna 83.

Further, the second antenna 83 is line-symmetric with respect to a vertical line (i.e., a center line) which passes through the center of (the recessed portion 84 of) the central portion 83A and is perpendicular to the longitudinal direction of the second antenna 83 (i.e., the second antenna 83 is line-symmetric left and right in the figure).

Although the present embodiment is exemplified by the case in which the angles $\theta_{31}$ and $\theta_{32}$ at which the central portion 83A meets the booster antenna portions 83B and 83B in the second antenna 83 are 90°, the present embodiment is not limited to this case. In the present embodiment, the angles $\theta_{31}$ and $\theta_{32}$ at which the central portion 83A meets the booster antenna portions 83B and 83B in the second antenna 83 may be equal to or greater than 90°. When the angles $\theta_{31}$ and $\theta_{32}$ at which the central portion 83A meets the booster antenna portions 83B and 83B in the second antenna 83 are less than 90°, the influence of loss at the bent portions is great, which reduces the communication distance.

The second antenna 83 is preferably arranged such that gaps $d_{31}$, $d_{32}$, and $d_{33}$ between the second antenna 83 and the three straight portions 12A, 12B, and 12D of the first antenna 12 are equal to or less than 2 mm. The gap $d_{31}$ is the space between the straight portion 12A of the first antenna 12 and (the side portion 84A defining the bottom of the recessed portion 84 of) the second antenna 83. The gap $d_{32}$ is the space between the straight portion 12B of the first antenna 12 and (the side portion 84B defining one side of the recessed portion 84 of) the second antenna 83. The gap $d_{33}$ is the space between the straight portion 12D of the first antenna 12 and (the side portion 84C defining another side of the recessed portion 84 of) the second antenna 83.

The purpose of this arrangement is to increase the electromagnetic coupling between the first antenna 12 and the second antenna 83. That is, the electromagnetic coupling between the first antenna 12 and the second antenna 83 may be reduced when the gaps $d_{13}$, $d_{32}$, and $d_{33}$ between the second antenna 83 and the three straight portions 12A, 12B, and 12D of the first antenna 12 exceed 2 mm.

As shown in FIG. 8, the second antenna 83 is preferably arranged along the first antenna 12 over a length which is equal to or more than three quarters of the length of the first antenna 12.

This makes it possible to increase the electromagnetic coupling between the first antenna 12 and the second antenna 83.

The arrangement of the first antenna 12 and the second antenna 83 may be any of those listed below.

(a) An arrangement in which the first antenna 12 and the second antenna 83 are included in the same plane.

(b) An arrangement in which the second antenna 83 is included in a plane that is different from a plane (hereinafter referred to as an "opening plane") in which the first antenna 12 is included, and (the recessed portion 84 of) the central portion 83A of the second antenna 83 overlaps the three straight portions 12A, 12B, and 12D of the first antenna when the opening plane is viewed in a plan view.

(c) An arrangement in which the second antenna 83 is included in a plane different from the opening plane and, when the opening plane is viewed in a plan view, at least one of the side portions 84A, 84B, and 84C, which constitute the recessed portion 84 in the central portion 83A of the second antenna 83, does not overlap the three straight portions 12A. 12B, and 12D of the first antenna 12 (provided that the gaps $d_{31}$, $d_{32}$, and $d_{33}$ (wherein the distance between the opening plane and the plane including the second antenna 83 is also taken into account) are equal to or less than 2 mm).

The non-contact data receiving/transmitting body 80 of the present embodiment may have any of the above arrangements (a), (b), and (c). Accordingly, the non-contact data receiving/transmitting body 80 of the present embodiment has high freedom of design.

A conductive plate-shaped (strip-shaped) antenna may be used as the second antenna 83. Such an antenna includes the following: an antenna made by punching a metal plate; an antenna including an insulating substrate and a conductive film formed on the insulating substrate, the conductive film being made of a conductive ink such as a known polymer-type conductive ink or a silver ink composition; an antenna including an insulating substrate and a conductive film formed on the insulating substrate by etching a metal foil on the insulating substrate; and an antenna including an insulating substrate and a metal thin film formed on the insulating substrate using various film formation methods such as metal evaporation, electroplating, or electrostatic plating.

Examples of the metal used here may include, but are not limited to, iron, stainless steel, and aluminum.

Examples of the thickness of the second antenna 83 may include, but are not limited to, 1 mm to 3 mm.

In the non-contact data receiving/transmitting body 80 of the present embodiment, the electromagnetic coupling between the first antenna 12 and the second antenna 83 is increased and the power supply point (i.e., the IC chip 11) is positioned adjacent to the second antenna 83. This allows the non-contact data receiving/transmitting body 80 of the present embodiment to perform long-distance communication.

The non-contact type data receiving/transmitting bodies 10, 20, 30, 40, 50, 60, 70, and 80 described above may be provided directly on an object (such as an article whose information is to be managed) and may be provided thereon via an adhesive or an adhesive material. Here, the expression "to provide the non-contact data receiving/transmitting body 10, 20, 30, 40, 50, 60, 70, or 80 on an object (such as an article whose information is to be managed)" indicates that the non-contact data receiving/transmitting body 10, 20, 30, 40, 50, 60, 70, or 80 is provided on an outer surface, an inner surface, or the like of the object. The non-contact type data receiving/transmitting bodies 10, 20, 30, 40, 50, 60, 70, and 80 may have any of a configuration in which the IC chip and the first antenna are integrally provided on one surface of a substrate, a configuration in which the second antenna is integrally provided on one surface of a substrate, and a configuration in which the IC chip, the first antenna, and the second antenna, i.e., all elements of the non-contact data receiving/transmitting body, are integrally provided on one surface of a substrate.

The first to fifth and eighth embodiments are exemplified by the case in which the first antenna 12 has a quadrilateral ring shape, the sixth embodiment is exemplified by the case in which the first antenna 62 has a pentagonal ring shape, and the seventh embodiment is exemplified by the case in which the first antenna 72 has a ring shape having three straight portions 72A, 72B, and 72D and one curved portion 72C.

However, the present invention is not limited to these cases. In the present invention, the first antenna may have any shape as long as it is a ring shape having at least three straight portions.

The first to seventh embodiments are exemplified by the case in which the second antenna includes a central portion and straight-shaped booster antenna portions that are connected to the central portion and extend from the central portion respectively to the left and right in the figure. In addition, the eighth embodiment is exemplified by the case in which the second antenna includes a plate-shaped central portion having a recessed portion and plate-shaped booster antenna portions that are connected to the central portion and extend from the central portion respectively to the left and right in the figure. That is, the eighth embodiment is exemplified by the case in which the second antenna is bent (i.e., recessed) at the central portion in the longitudinal direction of the second antenna. This second antenna is included in antennas, each having side portions which are formed by a central portion being bent such that parts of the central portion are at an angle equal to or greater than 90° to each other and extend along three straight portions of a first antenna.

REFERENCE SIGNS LIST

10 Non-contact data receiving/transmitting body
1 IC chip

12 First antenna
13 Second antenna

The invention claimed is:

1. A non-contact data receiving/transmitting body comprising an IC chip, a first antenna to which the IC chip is connected, and a second antenna for use as a booster that resonates with the first antenna in a non-contact manner,
wherein the first antenna is a ring-shaped antenna having at least three straight portions,
the second antenna has a central portion that is bent such that parts of the central portion extend respectively along the three straight portions of the first antenna and are at an angle equal to or greater than 90° to each other,
the IC chip is provided on the three straight portions of the first antenna and is connected to the first antenna at the straight portions, and
the first antenna and the second antenna are configured in a same plane;
wherein, when viewed in a plan view, the IC chip and the first antenna are disposed in the central portion of the second antenna;
wherein the second antenna includes
a plate-shaped central portion having a recessed portion, and
two plate-shaped booster antenna portions that are connected to the central portion and extend from the central portion respectively to the left and right sides,
the recessed portion of the central portion is a part recessed in the traverse direction of the central portion from one longitudinal side of the central portion which extends in the longitudinal direction,
the booster antenna portions are arranged in line symmetry with respect to a vertical line, which passes through the center of the central portion and is perpendicular to the longitudinal direction of the second antenna, and
the angle which is formed between the booster antenna portions and the central portion is equal to or greater than 90°.

2. The non-contact data receiving/transmitting body according to claim 1, wherein the second antenna is arranged such that gaps between the second antenna and the three straight portions of the first antenna are equal to or less than 2 mm.

3. The non-contact data receiving/transmitting body according to claim 1, wherein
the first antenna has a quadrilateral ring shape, and
the second antenna is arranged along the first antenna over a length which is equal to or more than three quarters of a length of the first antenna.

4. A non-contact data receiving/transmitting body comprising an IC chip, a first antenna to which the IC chip is connected, and a second antenna for use as a booster that resonates with the first antenna in a non-contact manner,
wherein the first antenna is a ring-shaped antenna having at least three straight portions,
the second antenna has a central portion that is bent such that parts of the central portion extend respectively along the three straight portions of the first antenna and are at an angle equal to or greater than 90° to each other,
the IC chip is provided on the three straight portions of the first antenna and is connected to the first antenna at the straight portions, and
the first antenna and the second antenna are configured in a same plane;
wherein, when viewed in a plan view, the IC chip and the first antenna are disposed in the central portion of the second antenna and
wherein,
the second antenna includes, when viewed in a plan view,
the central portion and
straight-shaped booster antenna portions that are connected to the central portion and extend from the central portion respectively to the left and right sides,
wherein,
the central portion of the second antenna is bent such that parts of the central portion are at an angle equal to or greater than 90° to each other and extend respectively along the three straight portions of the first antenna, and
the central portion of the second antenna is U-shaped.

5. The non-contact data receiving/transmitting body according to claim 4, wherein the two straight-shaped booster antenna portions are arranged in line symmetry with respect to a vertical line, which passes through the center of the central portion and is perpendicular to the longitudinal direction of the second antenna.

6. The non-contact data receiving/transmitting body according to claim 4, wherein the two straight-shaped booster antenna portions are arranged in non-symmetry with respect to a vertical line which passes through the center of the central portion and is perpendicular to the longitudinal direction of the second antenna, and
one of the straight-shaped booster antenna portions is shorter than the other of the straight-shaped booster antenna portions.

7. A non-contact data receiving/transmitting body comprising an IC chip, a first antenna to which the IC chip is connected, and a second antenna for use as a booster that resonates with the first antenna in a non-contact manner,
wherein the first antenna is a ring-shaped antenna having at least three straight portions,
the second antenna has a central portion that is bent such that parts of the central portion extend respectively along the three straight portions of the first antenna and are at an angle equal to or greater than 90° to each other,
the IC chip is provided on the three straight portions of the first antenna and is connected to the first antenna at the straight portions, and
the first antenna and the second antenna are configured in a same plane,
wherein, when viewed in a plan view, the IC chip and the first antenna are disposed in the central portion of the second antenna;
wherein the non-contact data receiving/transmitting body is formed having one of a first configuration and a second configuration, wherein in the first configuration,
the first antenna is a pentagonal ring-shaped antenna having five straight portions,
the second antenna includes, when viewed in a plan view,
the central portion and
two straight-shaped booster antenna portions that are connected to the central portion and extend from the central portion respectively to the left and right sides,
wherein,
the two straight-shaped booster antenna portions are arranged in line symmetry with respect to a vertical line, which passes through the center of the central portion and is perpendicular to the longitudinal direction of the second antenna, the angle which is formed between the straight-shaped booster antenna portions and the parts of the central portion which are connected to the booster antenna portions is equal to or greater than 90°, and the central portion has a tapered shape wherein in the second configuration, the first antenna is a ring-shaped antenna, which consists of a trapezoidal shape portion formed by the three straight portions and a round-arch shape portion connects with the trapezoidal shape portion, which consists of a curved portion, is arranged at a position corresponding to the upper base of the trapezoidal shape portion, and bulges outward from the upper base, the second antenna includes, when viewed in a plan view, the central portion and two straight-shaped booster antenna portions that are connected to the central portion and extend from the central portion respectively to the left and right side, wherein, the two straight-shaped booster antenna portions are arranged in line symmetry with respect to a vertical line, which passes through the center of the central portion and is perpendicular to the longitudinal direction of the second antenna, the angle which is formed between the straight-shaped booster antenna portions and the parts of the central portion which are connected to the booster antenna portions is equal to or greater than 90°, and the central portion has a tapered shape.

\* \* \* \* \*

UNITED STATES PATENT AND TRADEMARK OFFICE
CERTIFICATE OF CORRECTION

| | | |
|---|---|---|
| PATENT NO. | : 10,303,994 B2 | Page 1 of 1 |
| APPLICATION NO. | : 15/519029 | |
| DATED | : May 28, 2019 | |
| INVENTOR(S) | : Ooishi et al. | |

It is certified that error appears in the above-identified patent and that said Letters Patent is hereby corrected as shown below:

Title, Column 1, Line 1:   now reads "NON-CONTRACT DATA RECEIVING /TRANSMITTING BODY"
should read -- NON-CONTACT DATA RECEIVING /TRANSMITTING BODY --

Signed and Sealed this
Thirtieth Day of July, 2019

Andrei Iancu
*Director of the United States Patent and Trademark Office*